United States Patent [19]

Adelman

[11] Patent Number: 5,057,169
[45] Date of Patent: Oct. 15, 1991

[54] PROCESS OF PROTECTING A SURFACE USING A FOAM LAMINATE

[75] Inventor: Herbert B. Adelman, Hockessin, Del.

[73] Assignee: The Crowell Corporation, Newport, Del.

[21] Appl. No.: 306,096

[22] Filed: Feb. 6, 1989

Related U.S. Application Data

[63] Continuation-in-part of Ser. No. 63,573, Jun. 17, 1987, Pat. No. 4,823,945, which is a continuation-in-part of Ser. No. 665,383, Oct. 26, 1984, abandoned, which is a continuation-in-part of Ser. No. 589,699, Mar. 15, 1984, Pat. No. 4,601,157, and a continuation-in-part of Ser. No. 477,241, Mar. 21, 1983, Pat. No. 4,584,225, which is a continuation-in-part of Ser. No. 348,782, Feb. 16, 1982, abandoned, which is a continuation-in-part of Ser. No. 246,372, Mar. 23, 1981, Pat. No. 4,321,297.

[51] Int. Cl.$^5$ .................... E04F 15/00; B65D 65/02
[52] U.S. Cl. ........................ 156/71; 118/505; 150/166; 244/121; 280/770; 428/317.3; 428/339; 428/352
[58] Field of Search ............... 244/121, 1 R; 15/215, 15/216, 217; 428/316.6, 339, 352, 317.3; 118/505; 280/770; 150/166; 156/71

[56] References Cited

U.S. PATENT DOCUMENTS

| | | | |
|---|---|---|---|
| 2,526,389 | 10/1950 | Montefalco | 244/1 R |
| 2,654,684 | 10/1953 | Heikin | 428/317.3 |
| 2,880,015 | 3/1959 | Harben | 280/770 |
| 3,298,712 | 1/1967 | Greenstadt | 150/166 X |
| 4,024,837 | 5/1977 | Snyder | 428/40 |
| 4,086,384 | 4/1978 | Adelman et al. | 428/193 X |
| 4,313,987 | 2/1982 | McCormick | 156/249 X |

Primary Examiner—David A. Simmons
Assistant Examiner—Chester T. Barry
Attorney, Agent, or Firm—Connolly & Hutz

[57] ABSTRACT

Cushioned packaging and protecting with laminate of a thin resilient resin foam layer adhered to a strong supporting sheet. Laminate may also have metal foil or metallized layer, and/or water-repellent surface layer, and/or antistat surface layer and/or volatile corrosion inhibitor and/or a cohesive-nonadhesive surface coating or a low-tack pressure-sensitive adhesive coating. Automatic packaging of a series of articles between long webs of wide cushioning laminates having faces of heat-sealable foam. One web is fed foam-face-up across a table, the articles to be packaged placed on it in spaced locations, heat applied to foam edges to just about melt the foam there, and a second web applied foam-face-down over the spaced articles and heat-sealed to the lower web at its edges. Tranverse heat sealing and severings are effected between successive articles. The heat sealings can be set by cold pressings. Web backings can be made relatively non-porous to minimize bleed-through of melted foam.

6 Claims, 3 Drawing Sheets

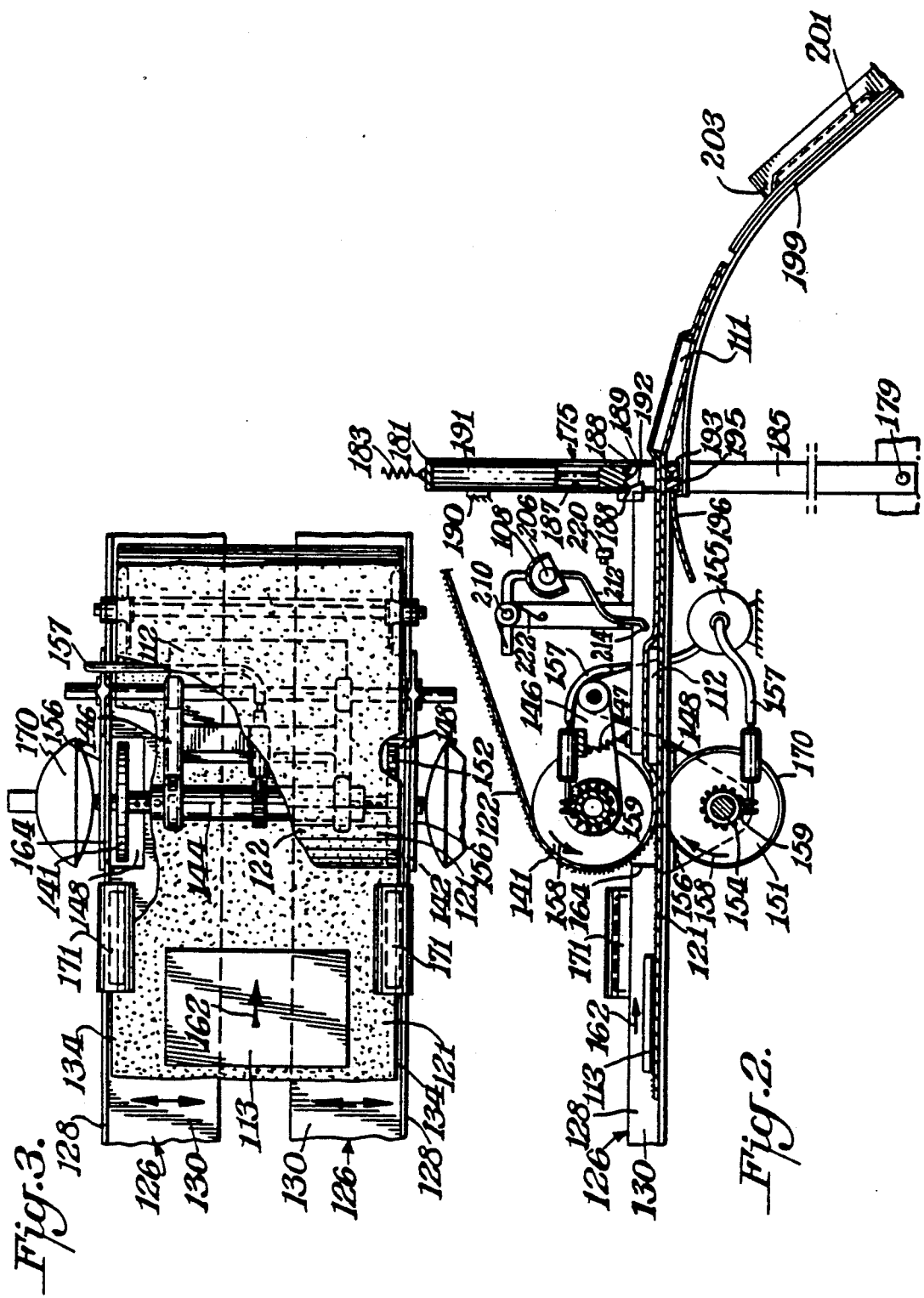

PROCESS OF PROTECTING A SURFACE USING A FOAM LAMINATE

This application is a continuation-in-part of application Ser. No. 63,573 filed June 17, 1987, (Pat. No. 4,823,945), which is a continuation-in-part of application Ser. No. 665,383 filed Oct. 26, 1984 (subsequently abandoned) which in turn is a continuation-in-part of

| Ser. No. | Filing Date | Status |
| --- | --- | --- |
| 589,699 | March 15, 1984 | Patent 4,601,157 |
| 477,241 | March 21, 1983 | Patent 4,584,225 |

The '241 application is in its turn a continuation-in-part of application Ser. No. 348,782 filed Feb. 16, 1982 (subsequently abandoned) which is a continuation-in-part of Ser. No. 246,372 filed Mar. 23, 1981 (U.S. Pat. No. 4,321,297)

The present invention relates to the cushioning of articles with thin protective layers of resilient foam that are laminated to even thinner but much stronger supporting sheets.

Among the objects of the present invention is the provision of novel cushioning arrangements and techniques with such laminates.

These, as well as additional objects of the present invention, will be more fully understood from the following description of several of its exemplifications, reference being made to the accompanying drawings wherein:

FIG. 2 is a similar illustration of a modified packaging apparatus;

FIGS. 3 and 4 are plan and transverse sectional views, respectively, of the apparatus of FIG. 2;

Figure 1:
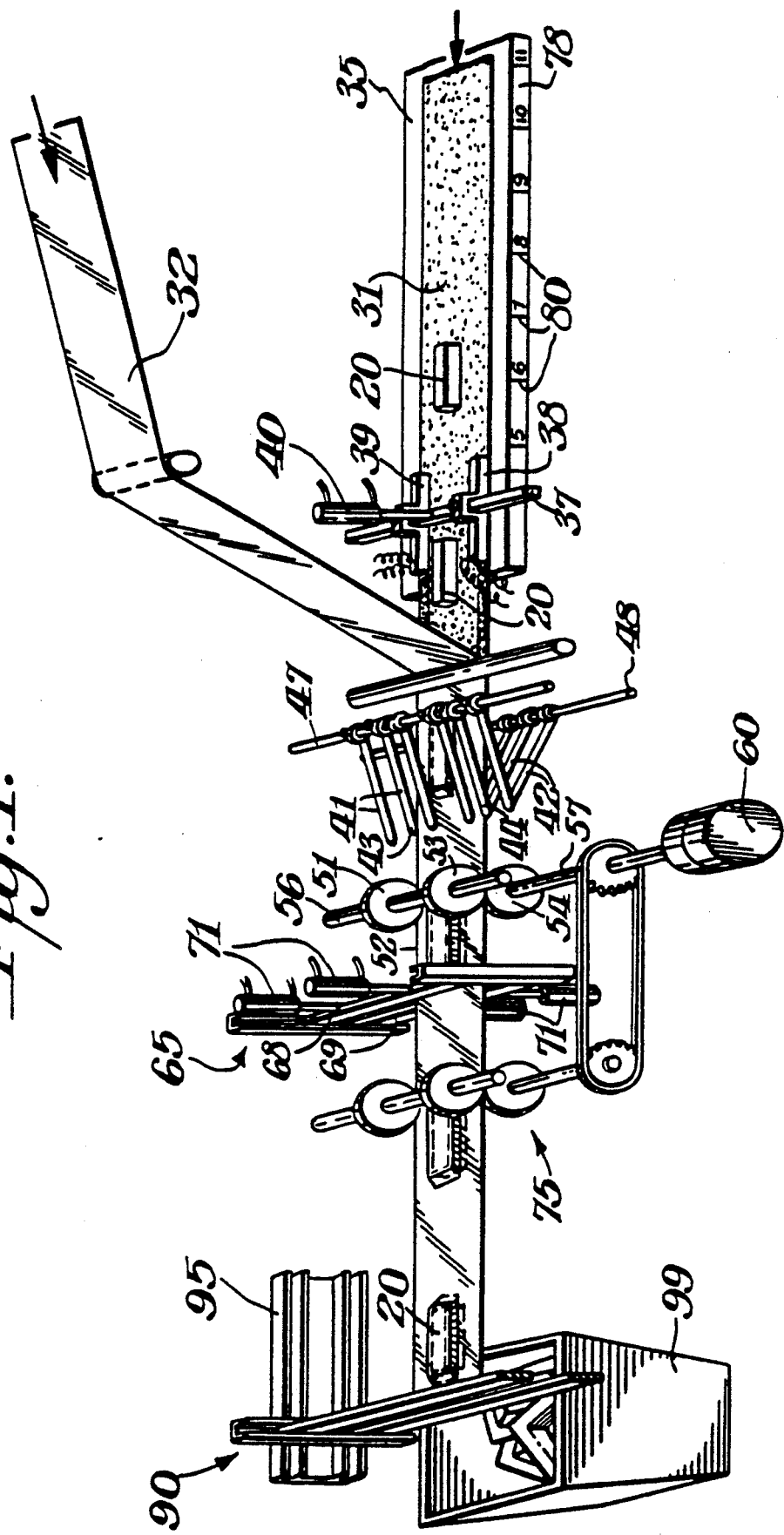
FIG. 1 is a diagrammatic illustration of an automatic packaging apparatus suitable for use pursuant to the present invention.

As described in the parent applications, a backed sheet of thermoplastic foam can be heat sealed to a desired surface by pre-heating to sealing conditions the face of the foam at the proposed sealing location on the sheet, then pressing that sealing location against the desired surface to bring the pre-heated foam in sealing contact with that surface and maintaining the pressing while causing the melted foam to cool and solidify. The pressing need not immediately follow the melting, but can be delayed a few seconds and thus permit partial cooling. Also, where the backing for the foam is paper, the pre-heating can be controlled to keep the pre-heated foam and the laminant that secures it to its backing from bleeding through that paper.

The heat sealing can be against another backed sheet of foam or another portion of the same backed sheet, as for instance, to form an envelope or wrapper for packaging articles. Such packaging is shown in U.S. Pat. No. 4,253,892, as well as in parent Ser. No. 589,699.

Polypropylene resin is a very suitable composition for the thermoplastic foam of both backed sheets, although polyethylene foam and polystyrene foam, as well as other heat-sealable foams can be used. Thermoplastic resins, when melted by the above-mentioned pre-heating and then pressed, tend to bleed through a porous backing layer like paper. To inhibit or completely prevent such bleed-through, such porous backing layers can be rendered more impervious as by providing a metallized stratum on the foam-engaging surface of the backing layer. A layer of metal foil such as 0.0003 inch thick aluminum between the foam layer and a paper backing layer is also very effective in preventing bleed-through.

In packaging articles between two long advancing sheets or webs of the backed foam, as in the above-cited prior processes, it is preferred that the heat-sealing at the longitudinal edges of the advancing sheets be effected with the help of melting shoes, and the transverse heat sealing be effected between pressing members each of which engages the backing layers of the backed foam laminate. Preferably each transverse seal is made by two pressings, the first pressing being between heated pressing members that are hot enough for the heat to penetrate through the backing layers and thus bring the foam layers to heat-sealing temperature. The second pressing is between pressing members that cool the hot pressed location to set the heat seal. The pressing members for the second pressing can also be combined with a cutting mechanism to sever the packages that are completed by that pressing.

For best results when doing the foregoing type of packaging of a succession of articles, each of substantial height between two advancing long wrapper webs or sheets, the sheets covering the articles sandwiched between them are advanced at a pre-determined level between upper and lower resilient members or fingers that urge the carried articles toward that level from above and below. This makes the packaging essentially symmetrical with respect to that level, and is more effective than the prior art use of upper fingers with a lower fixed non-resilient stop that can be adjusted in position.

Turning now to the drawings, FIG. 1 diagrammatically illustrates the packaging of a succession of articles 20, such as small packages of pharmaceuticals or engine parts or electronic components, between a lower wrapper web or sheet 31 and an upper wrapper web or sheet 32. Sheet 32 is a paper-foam laminate and sheet 31 is a paper-foil-foam laminate, as described for instance, in parent U.S. Pat. No. 4,321,297. Lower sheet 31 is unwound from a supply reel that is not shown and fed foam-side up across the top of a loading table 32. As that sheet traverses the table, a spaced succession of the articles 20 are placed on its upper surface either by hand or with automatic article feeders.

At the discharge end of table 35, the side edges of sheet 31 pass under melting bars 38 and 39 which are electrically heated and have their lower faces about ½ inch wide and about 4 to 10 inches long resting on the foam surface. Guide pins can be mounted in the table top along both edges of sheet 31 to help assure proper alignment of the sheet with the melting bars.

The melting bars are heated to temperatures high enough to melt at least some of the foam which they contact. Where the foam is polypropylene, the temperature, as measured at the heating coils inside the melting bars, can be about 500° to about 550° F. For other plastics that melt at temperatures lower than polypropylene, the heating coils can be at lower temperatures. It should be noted that the temperature of the melting bars' foam-engaging surfaces is much lower than the coil temperature.

The physical interaction between the melting bars and sheet 31 may tend to cause the sheet edges to move toward each other with the central portion of the sheet bulging upwardly. The weight of the articles 20 resists such distortion, and the distortion resistance can be further opposed by fitting some rollers or spring fingers over sheet 31 where it approaches the melting bars to press the sheet against table 35 between articles 20 and the melting bars.

Further travel of sheet 31 brings it and the articles carried by it under the upper sheet 32 which is laid over it with the foam layer of sheet 32 facing downwardly. This sandwich moves between a set of downwardly biased upper spring fingers 41 and a set of upwardly biased lower spring fingers 42. These sets of spring fingers are held in adjustable positions along rods 47 and 48 and can be adjusted so that some of the fingers act as edge guides for the sandwiched sheets, as illustrated at 43 and 44.

There is no table or other lower support for the sandwiched assembly at the location of the fingers 41 and 42, so that the fingers, all of which have about the same resilience, cause each sandwiched article to be held so it projects about equally above and below the plane of the sheets. This symmetrical positioning helps keep the edges of the upper sheet 32 aligned with the edges of the lower sheet 31, even though the bulge in the sandwich caused by the sandwiched article draws the edges of each sheet toward each other.

Immediately downstream of the fingers 41 and 42 is a set of advancing pinch rollers 51, 52 (concealed from view), 53 and 54 that are strongly urged toward each other to engage the side edges of the sandwiched assembly and cool them as well as pinch them together. This cools and sets the melted foam to complete the lateral edge sealing of the sandwiched articles. These pinch rollers are adjustably fixed on elongated shafts 56 and 57 and only one of the shafts need be driven as by electric motor 60 to pinch and pull the sandwiched assembly through the apparatus.

Internal coil temperature of 550° F. and 1½ seconds may be required for heated bars 68 and 69 to cycle into, through and out of pressing engagement against the upper and lower faces of a sandwiched assembly in which the foam is polypropylene resin and the foam is backed by Kraft paper or a paper-aluminum-foil laminate about 5 mils thick. The dwell is best controlled by a pre-set adjustable timer. The lateral pressing cycle can start slightly before the downstream movement of the sandwiched stops, and the downstream movement can resume slightly before the cycle ends.

Another set 75 of advancing rollers can be provided downstream of the transverse sealing bar mechanism 65, if desired. Such an extra set helps assure the proper advancing of the sandwiched assembly, particularly when the advancing is abruptly started after the completion of a stationery transverse heat-seal dwell.

The distance between successive transverse heat seals corresponds to the spacing between locations of the individual articles 20. Accordingly, the setting that fixes the amount of advancement effected by motor 60 in one advancement step, can be keyed to an indicator that designates where articles 20 are placed on sheet 31.

As shown in FIG. 1, the edge 78 of table 35 can be provided with scale markings 80 designating the locations of articles 20 when the successive advancement steps range, for example, from 5 to 11 inches. The five-inch marker would then be measured upstream from the transverse heat-seal bars a whole number of multiples of five inches, plus the 2½ inches needed to locate the center of the next five-inch space. The six-inch marker would similarly be measured to whole numbers of multiples of six inches—plus three inches, etc. These markers would then show where the appropriate articles 20 are to be located while the sandwich assembly is stopped during a transverse heat-sealing pressing. Packages to be made with lengths intermediate between those designated by markers 80 can have their locations interpolated between the appropriate markings.

If desired a separate set of marked strip scales can be provided, one such scale having a group of markings exactly five inches apart, another exactly six inches apart, etc. For a specifically dimensioned package, the appropriate strip scale can then be mounted over table edge 35 with one marking of that strip scale aligned with the appropriate marking 80. The strip scale then indicates where a series of articles 20 are to be positioned when the sandwich movement pauses during transverse heat sealing. This enables the accurate positioning of a number of the articles during a single such pause.

The final stage in the heat-sealing sequence is effected with a set 90 of pressing-and-severing bars. These bars can be very similar to the heat-sealing bars 68 and 69 but do not require heating, and a serrated cutting blade is fitted in the sandwich-engaging face of one bar so as to protrude and cut through the sandwich. A groove can be formed in the other pressing-and-severing bar to mate with and receive the protruding blade when it penetrates through the sandwich.

The pressing-and-severing bar mechanism, including its vertical press-guiding rails, is held between longitudinally directed side rails 95 to which it can be fastened at a location that causes its bars to press and sever the sandwich exactly at the transverse heat seal formed by the mechanism 65. Preferably the pressing-and-severing is effected one advancing step, but not more than two advancing steps, downstream from the first transverse heat-pressing. The pressing-and-severing bars then do a good job of cooling and setting the transverse heat seal, particularly if the faces of the pressing-and-severing bars contacting the sandwich are made of a metal such as aluminum.

Where the transverse heat seal has cooled excessively before being engaged by the pressing-and-severing bars, it is helpful to have the latter bars heated to at least partially restore to the heat-seal some of the heat that enables that seal to be set under pressure. Such pressure setting is the preferred heat-sealing technique.

A container 99 can be provided to receive the individual packages as they are severed from the advancing end of the sandwich assembly. They show no bleed-through even though upper sheet 32 contained no bleed-blocking stratum. However, both sheets 32 and 31 can contain such strata if, for example, it is desired that those sheets be of identical construction.

The bleed-through difficulty at the longitudinal seals can be minimized or completely avoided by careful control of the edge heating. Thus, the melting bars 38 and 39 can be lifted away from the foam face of sheet 31 during the time interval in which that sheet pauses between advancing steps. The resulting edge heating is more uniform in that the large amount of localized heating during advancement pauses, is eliminated. The extra cooling of the melted foam during such no-heat pauses is quite uniform. With such a modification the resulting uniform melting can be controlled so that the melted resin is not too fluid and the porosity of porous foam backings does not permit significant bleed-through.

In place of container 99, a take-off conveyor can be supplied to support and remove cut packages as they leave the base of assembly 90. Such take-off conveyor can be of the belt type with the belt travelling a little faster than the package sandwich, to help assure the clearing of sandwiches from the cutting assembly.

If desired a table can be positioned under the package sandwich as it leaves roller assembly 75, to help guide the sandwich to the cutting bars of assembly 90.

All of the sealing structures of FIG. 1 are of adjustable width, except for the pressing structures 65 and 90. The adjustable widths can accordingly be adjusted to effect the desired packaging with sheets 31 and 32 of any width within the adjustment range, for instance, from 5 to 12 or more inches. The pressing structures 65 and 90 extend the full width of the widest adjustment, and accordingly need no separate adjustment.

The packaging output of the apparatus of FIG. 1 can be increased by using wide packaging sheets and packaging two transversely-aligned rows of articles at once. To this end a third melting bar can be longitudinally positioned half-way between the side edges of the sheets, a third pair of pinching-and-advancing rollers can be correspondingly fitted on shafts 56 and 57, and a longitudinally oriented stationery or rotating severing blade can be fitted between the pinching-and-advancing rollers of mechanism 75 to sever the wide dual sandwich assembly into two side-by-side halves as the assembly is pulled through it.

The packaging technique of the present invention can be modified as by eliminating one of the melting bars in FIG. 1 or cutting off its heating current. The packaging operation will then yield packages having an unsealed edge through which articles such as letters can be subsequently inserted, after which the unsealed edge is sealed, for example, with a simple bag-end heat sealer or by cementing or stapling. In such a modification, the articles 20 need not be pre-packaged in the bags, but can be withheld from the packaging apparatus and later inserted in the open-ended packaging bags thus formed. The finger assembly 41 and 42 can then also be omitted.

Instead of using two separate wrapper sheets 31 and 32 in FIG. 1, a single sheet twice as wide as either sheet 31 or 32 can be used. Such a wide sheet can then be automatically folded over along its longitudinal axis to make a sandwich similar to that of FIG. 1, which sandwich can then go through the heat-sealing sequence, but without the melting bar that would otherwise be located where the fold line is. Such a foldover combination is shown in U.S. Pat. No. 3,696,580. Both melting bars can be omitted with such a folded sandwich, if it is desired to make open-ended bags.

When making open-ended bags, the opposing walls of the bags need not be of identical shape at the open end. Thus, one bag wall can project out further than the opposite wall, so as to provide a flap that can be subsequently folded over the shorter wall and sealed envelope-style.

If desired the apparatus of FIG. 1 can be fitted with applicators to apply adhesive or heat-sealing improvers such as described in U.S. Pat. Nos. 3,916,076 and 3,393,081, to the sites on sheet 31 and/or sheet 32 before the sealing is effected at those sites. The melting bars can then have their temperatures reduced or the bars completely eliminated. Similarly, the temperature of transverse heating bars 68 and 69 can be reduced, and one set 65 or 90 of the transverse bars can be eliminated.

The packaging sheets of the present invention can be treated or coated with materials, such as anti-static agents, volatile corrosion inhibitors and the like, such as those mentioned in U.S. Pat. No. 4,321,297, in Ser. No. 477,241 and in PCT application U.S. Pat. No. 86/01731 published Feb. 26, 1987 under No. WO 87/01092, as well as Ser. No. 157,272 filed Feb. 17, 1988 and subsequently abandoned. Some coatings of this type improve or do not interfere with the heat-sealing and so can be coated over the entire foam face of one or both packaging sheets. Where such added materials interfere with the heat-sealing, it is preferred that such materials be coated in locations at which heat-sealing is not effected.

With a metal foil or metallized backer contained in one or both of the packaging sheets, the resulting package will protect the article packaged in it against electric fields. Such protection is particularly desirable when packaging transistors or similar electronic articles that are constructed for operation at very low voltage. For such protection it is preferred to have the packaging in a single packaging sheet that is folded over as described above. By such fold-over, the metal foil or metallized layer covering one side of the packaged article is electrically continuous with the metal foil or metallized layer covering the other side of the packaged article, so that the protection against electric fields is improved.

For maximum protection against electric fields, copper or silver foils are better than aluminum foils, and thin copper foil with a very thin, e.g. ½ micron thick, flash coating of silver may be most cost-effective. Such a flash coating can be applied to only one face of each foil.

The backing layer covering a foil-carrying sheet can be provided with openings, as for example, along its borders so that a grounding connection can be clipped to those borders and thus ground the foil.

Whether or not the metal foil shielding is one fold-over sheet or two opposing sheets, it is a very effective barrier against the penetration of moisture vapor. Accordingly, by doing the packaging in a very low humidity atmosphere, e.g. below 30% relative humidity at room temperature, the danger of corrosion for packaged water-sensitive material is sharply reduced or completely eliminated. Plastic films like polyethylene terephthalate are also good moisture barriers, particularly when they have metallized surfaces.

The rate at which the packaging sheets advance through the packaging sequence can be varied. It is preferred that the time interval between the respective heatings at the melting bars and transverse heat-sealing bars, and the respective pressings at the pinch rollers and transverse bars 90, be not so long as to permit excessive cooling between those pressings. Six seconds can be well tolerated, but about 15 seconds is too long. To keep this time interval small, the number of advancing steps during the interval should be no greater than two. It is generally helpful to complete an advancing step in about one second or less, even if such a step requires a 12-inch or as much as a 20-inch travel. Also, the pressing dwells are preferably no longer than two seconds each.

Although heat sealing generally takes more time than the cold pressure sealing that has been used with the cohesivenonadhesive coatings of the prior art, the automatic heat-sealing of a sequence of articles into successive packages pursuant to the present invention can be effected at a rate very close to, if not faster than, the prior art cold sealing.

Figure 4:
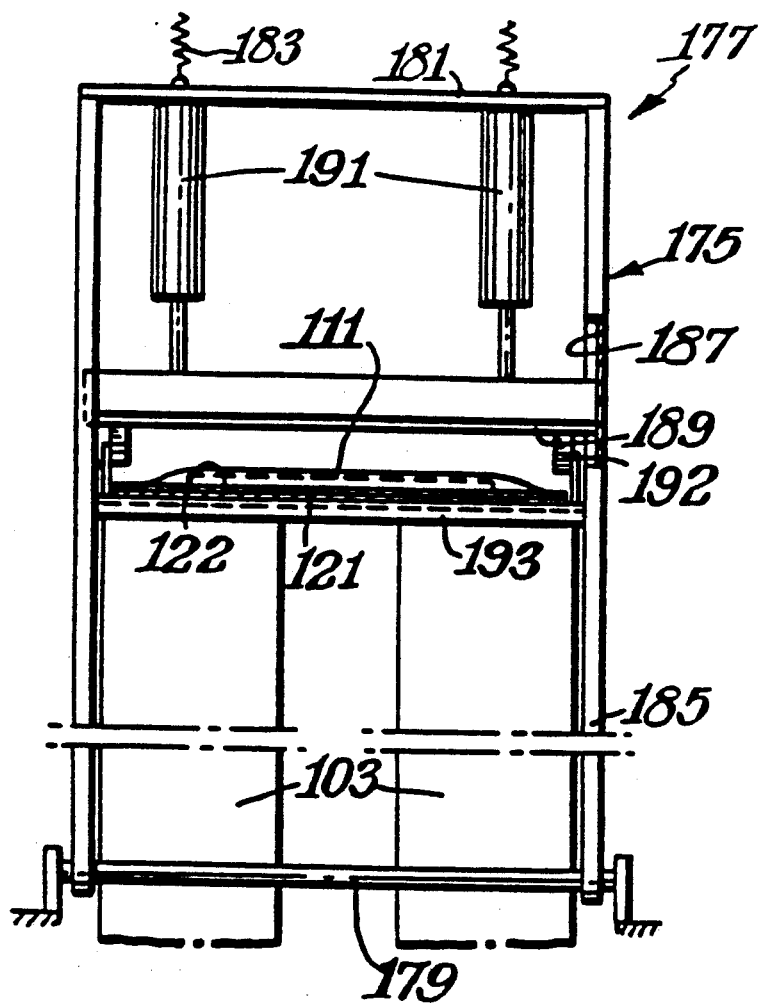

FIGS. 2, 3 and 4 show a succession of relatively flat boards 111, 112 and 113 being packaged between two paper-foam packaging laminates 121 and 122. These laminates can be of the types described in parent U.S. Pat. No. 4,321,297, carrying an anti-static or corrosion-inhibiting layer or a layer that contains both an anti-stat and corrosion inhibitor, on the face of the foam. The foam layer itself is preferably one that heat seals at about 100° C. and is no thicker than about 3/16 inch. The anti-stat and/or corrosion inhibitor can lower the heat sealing temperature to about 95° C. The backing for the foam is preferably not over about 1/16 inch thick with a tensile strength at least 20 times that of the foam layer.

Each laminate 121 and 122 is provided as a long sheet rolled up and held on a dispensing reel, not illustrated. Sheet 121 is fed foam side up onto a spaced pair of adjustable supporting angles 126 adjusted so that the floors 130 of the angles are essentially in a horizontal plane, with flanges 128 extending upwardly and closely fitted about the sheet's side edges 134.

Sheet 121 is pulled longitudinally along the guiding angles by two pair of gripping discs 141, 142, 151 and 152. Discs 151 and 152 are fitted to an adjustable shaft 154 that is rotatably held in two brackets 156, mounted under the supporting angles 126. Discs 141 and 142 are similarly fitted to an adjustable shaft 144 above the guides, rotatably held by an arm 146 which is resiliently pressed downwardly as by spring 147 to cause the upper discs 141 and 142 to pinch against the lower discs through slots 148 cut in the angle floors 130. Either or both pairs of discs are rotated in the direction of arrows 158 as by sprockets 159 mounted on the disc shafts and driven by worms connected by flexible shafts 157 to the opposite ends of the armature of a drive motor 155, so that the outer face of each disc is exposed. The discs pinch the packaging sheets 121 and 122 between them and in this way pull them in the direction of arrow 162 along the supporting angles. Notches 164 can be cut out of the upwardly extending flanges 128 to keep them from covering the outer faces of discs 141 and 142.

The articles 111, 112 and 113 are placed on designated spaced locations on the foam face of sheet 121 as it is pulled along. At the same time, the second packaging sheet 122 is pulled from its dispending reel to engage the edges of discs 141 and 142 and to be thus pulled down into firm foam-to-foam engagement with the lower sheet downstream of where the articles to be packaged are placed on the lower sheet.

The outer faces of all the discs are heated by reflector-equipped heat lamps 170 placed so they focus infrared radiation on those faces as well as on the adjacent edge portions of the packaging sheets. Additional heat lamps 171 can be aimed directly at the sides of the sheet faces at locations just upstream of the disc edges to further pre-heat all or some of those sheet edges immediately before they are pinched together by the discs. This pre-heating supplements the pre-heating of the upper sheet as it is pulled around the hot edges of upper discs 141, 142 from the disc tops to the disc bottoms. For best results, the pre-heating of lamps 171 is confined essentially to the narrow sheet locations at which the pinching and sealing take place.

A transversely extending frame 177 has an upper cross piece 181 held by springs 183 that extend to an overhead mounting site, to thus hold the frame in its upright position, as illustrated. The side members 185 of the frame have their upper portions in the shape of channels 187 that open towards each other to provide tracks within which is slidably fitted a guillotine cutter 189 that extends transversely of the packaging sheets and is as long as the widest packaging sheets to be processed. Cutter 189 is connected for vertical reciprocation by a pair of air cylinders 191 actuated by flexible air hoses that are not illustrated. An anvil 193 is fixed between the frame side members 185 and has a slot 195 to receive the guillotine blade and embedded in the anvil are electric resistance heaters that heat the anvil to heat-sealing temperature. Similar heaters can be incorporated in the guillotine cutter 189 on either side 188 of its cutting blade. The lower faces at 188 are horizontally flat so that when the cutter is propelled downwardly the faces at 188 forcefully engage the packaging sheets and press them against heated anvil 193. This act of propulsion also transversely cuts the packaging sheets and is timed so that it occurs when a portion of the packaging sheets about halfway between successive packaging articles, is over the anvil.

The forceful pressing of the cutter against the anvil is maintained for the length of time needed for the heat from the anvil and from heaters at 188 to effect a transverse heat-sealing across the packaging sheets. This may take as long as a second or so, and during that time the packaging sheets continue to be advanced by the pinching discs to push the cutter-and-anvil assembly in the advancing direction, to pivot the cutter frame 177 around its pivot 179. When the transverse heat-sealing is completed the air cylinders 191 cause the guillotine cutter 189 to be retracted away from the anvil, thus releasing its grip on the packaging sheets. The packaging sheet section downstream of the cutter is accordingly released and slides down the curved guide plate 199 as a completed package indicated at 201. Adjustable side guides 203 may be provided to help direct the completed package.

Upon the retraction of the cutter 189, the packaging sheets upstream of the cutter are no longer gripped between cutter and anvil, so that springs 183 pivot the frame 177 back to the vertical position against stop 190. The cutter frame is now ready to make the next transverse cut and heat-seal. Arcuate fingers 196 extend from the anvil and follow it in its downstream movement to help support the downstream end of the packaging sheet assembly while the anvil is later returned by springs 183. One cycle of such heat-sealing transversely seals the packaging sheets on both sides of the cutter blade, so that it closes the upstream end of the package being cut loose as well as the downstream end of the next package.

The cutter 189 preferably has its cutting edge serrated or inclined guillotine-style at about a 5° to 20° angle with respect to the anvil which can be horizontal. This serration or inclination gives the cutting a scissors-like action that reduces the cutting force.

To help the incoming packaging sheets push the transverse sealing assembly 177 the cutter actuation can be connected to independently start rotating that assembly, as by having the side face of cutter 189 engage a cam 192 as the cutter reaches heat-sealing engagement.

The guide angles 126 and pinch discs are all arranged to be adjusted for packaging sheets of different width. The transverse cutter extends to the maximum width of the guide angles and needs no width adjustment.

It is also helpful to apply some pre-heat to the transverse sealing site. Thus a long thin heat lamp 206 can be mounted in a reflector 208 that directs the lamp output as a narrow band approximately ½ inch wide and as long as the entire width of the transverse sealing assembly. The lamp-carrying reflector 208 is pivotally mounted as at 210 so that it can pivot and in this way longitudinally scan along the longitudinally sealed packaging sheet assembly immediately upstream of the transverse sealing site.

This scanning is shown as controlled by a control arm 212 projecting downwardly from the reflector and having a sensing tip 214 hanging in the path of the bumps formed where the packaged articles are sandwiched. As such a bump reaches the freely hanging tip during the progress of the packaging, it engages and pushes the tip in the downstream direction thus tilting reflector 208 to cause the pre-heat it directs to scan downstream in synchronism with the sandwiched articles.

Sensing tip 214 is shaped and pivoted with relation to the shapes of the bumps, to cause the reflector tilting to remain accurately focussed at the same location on the top surface of the upper packaging sheet 122, moving with that sheet so as to effectively pre-heat that location just before the transverse heat-sealing takes place at that location. To this end the sloping nose of a bump coacts with the tip 214 to gradually slow the rate of reflector tilt a little, after the tilting starts, to thus compensate for the extra advancing effect that the tilting has on the heat projection. The transverse heat-sealing is shown as controlled by a limit switch 220 in the tilt path of control arm 212.

Tip 214 is made springy and short enough to be tilted completely out of the way as, or shortly after, switch 220 is actuated, so that the bump causing the tilting passes by. When that passage is completed the tip is pulled back to the illustrated position by return spring 222, and is now ready for the next bump.

Instead of, or in addition to, the pre-heating of the upper surface of the upper sheet 122, similar pre-heating can be applied to the lower surface of packaging sheet 121 in corresponding locations. The same control can be used to direct both such transverse pre-heatings. Infra-red radiation can also be used to pre-heat the foam face of packaging sheet 122 along the heat-sealing region, as that sheet travels around disc 141. Pre-heating can also be applied to the lower face of packaging sheet 121.

The heat lamps 170 can be replaced by electric resistance heaters fitted to the outer faces of the discs and electrically insulated from those faces. Such heaters have circular contacts that are carried by the discs and are engaged by fixed brushes connected to a supply of electric current.

The output of the packaging machine can be increased by widening it so that it operates on packaging sheets twice as wide and then fitting each pinching disc shaft with an additional pinching disc midway between the two illustrated in FIG. 3. The two additional pinching discs can moreover be provided with a cutting edge and mating groove so that they slit the wide packaging sheet longitudinally along its center line, and also heat seal on both sides of the slit. Articles can then be simultaneously packaged on each lateral half of the packaging sheet combination.

For the present invention it is desirable to use polyethylene foams, and particularly foams of low-melting polyethylene which can be heat-sealed at 95° C. or even somewhat lower. Foams made of well-plasticized resins are also desirable because they also have low melting points. The anti-stat and volatile corrosion inhibitors are preferably plasticizing agents for the resins they are coated on, to lower their melting points. However polypropylene, polystyrene and other heat-sealable foams can also be used.

Where high output is not needed, the machine of FIG. 2 can be operated stepwise so that the packaging sheets are given a succession of stepwise advances with the sheets stationary between steps. The stationary dwells are made sufficiently long in time to permit the guillotine cutter to cut and heat-seal transversely. At the same time the longitudinal heat-sealing discs should not be so hot as to char the sheets during the dwell for the transverse heat-sealing. The transverse heat-seal frame 177 need then not be pivotally mounted.

Figure 5:
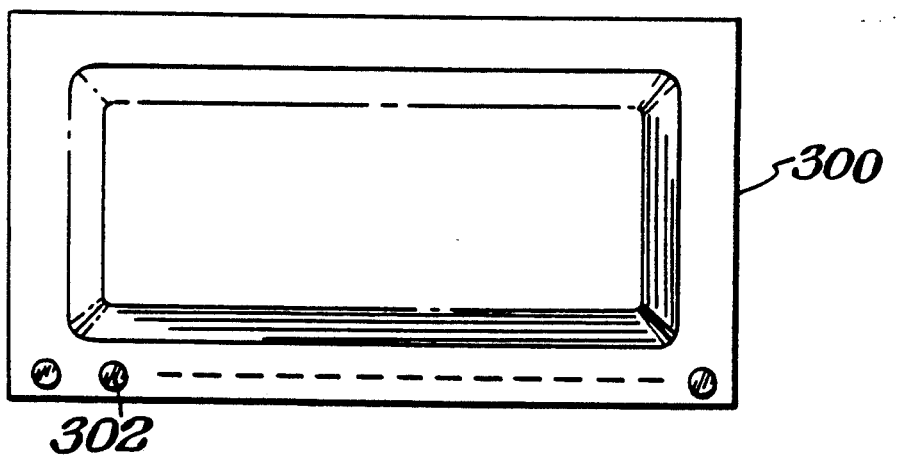
FIG. 5 is a view of a cushioning package that can be made with the apparatus of FIGS. 1 or 2.

The supported foam laminates used in the present invention can have supporting laminations that need not be paper. While paper is a very desirable supporting member by reason of its low cost as well as its strength and resistance to damage by the heat needed for heat-sealing, the paper can be replaced by sheets of felted fibers other than cellulose or by plastic films or even metal foil. Foils of metal such as aluminum preferably have thicknesses of up to about 10 mils, inasmuch as greater thicknesses unduly add to the expense as well as to stiffness of the supported foam. Metal foils 0.5 mil thick or 0.35 mil thick or thinner are preferably laminated to paper to provide a strong two-layer support for a layer of cushioning foam. Such a support can be used with the paper or foil layer against the foam. Similarly, a metallized paper support can be used with its paper or metallized coating against the foam. Where a paper-foil laminated support has its paper face on the outside of the foam-support combination, the paper preferably has a number of perforations at least about ¼ inch in diameter punched out near an edge before the foil is laminated to it. This is illustrated in FIG. 5, where a sandwich package 300 has edge perforations 302, and is particularly suited for the application of a grounding clip.

Metal supporting layers sandwiched about an electrically sensitive object can be electrically connected together by the cutting action that separates individual packages, and/or by stapling or the like, to form an electrical shield around the object packaged. Metal supporting layers are also very highly conductive to heat so that heat-sealing times can, with metal-foam laminates, be reduced to less than ½ second.

Polyethylene terephthalate films or felted fiber sheets that withstand temperatures of about 160° C. that may be applied to effect heat-sealing are also suitable and can be used in film or sheet thicknesses as small as ½ or 1 mil. Such small thicknesses are still quite strong and also reduce the time required for the heat-sealing heat to penetrate through to the foam.

Microwave dielectric heating is also suitable, particularly since it generates heat inside the sheet, and can be used whether or not foils or metallized layers are present.

Supporting layers of woven or unwoven strips of plastic film about 1 to 3 millimeters wide can also be laminated to the heat-sealable foam to make packaging sheets.

A foam support can be made of combinations of layers. Thus, a paper layer can be reinforced with glass or other fibers or laminated with metal foil or plastic film.

The machines of FIGS. 1 through 4 can be modified as disclosed in Ser. No. 589,699 and in application Ser. No. 783,430 filed Oct. 4, 1985 (Pat. No. 4,790,433). The contents of both of those prior applications are hereby incorporated herein as though fully set forth.

The pre-heating of FIGS. 2, 3 and 4 should be adjusted to cause the subsequent sealing operations to barely bring the foam to heat-sealing temperature, slightly below the melting range of the foam, so no special provision need be made for cooling the heat-seals under pressure. Such supplemental cooling can be provided, if desired, and this enables greater tolerance in the degree of heating used to make the tightest heat seals most difficult to tear open. Without such cooling, the heat-sealing adheres the heat-sealed parts together but they are then easier to tear apart.

Pressure cooling of the heat seals in the apparatus of FIG. 2 can be effected by leaving the discs 141 unheated so they help cool the pre-heated sheet edges as they are pressed together and sealed.

The transverse sealing effected by the apparatus of FIG. 2 can also be similarly after-cooled, by having the transverse pre-heating sufficiently intense and leaving the transverse pressing members unheated.

The paper-foam laminates are very suitable for protecting a key surface while work is being done.

According to the present invention, an important or key surface is protected by a foam laminate while work is being done on or near it, or where the surface is being used as a temporary walkway. The laminate has a thin layer of smooth- or nonabrasive faced resilient foam not over about ⅛ inch thick adhered to a supporting wear-resistant layer less than 1/25 inch, preferably less than 1/50 inch thick, the face of the foam layer that is not adhered to the supporting layer carrying a stratum of friction-increasing material that reduces the tendency of the laminate to slide along a surface on which that face is placed.

A low-tack pressure-sensitive adhesive is a particularly desirable friction-increasing material to more securely hold a foam laminate against a surface from which it is to be subsequently removed without leaving a residue. Depositing such adhesive from a solvent onto either face of the laminate causes the adhesive to adhere to that face more strongly than to a surface against which the dried adhesive-carrying face is then merely pressed.

It is particularly helpful in the packaging arrangements of FIGS. 1 and 2, to have a low tack pressure-sensitive adhesive coating on the upper surface of the lower wrapping sheet 31 or 121. Such a coating will hold and prevent the shifting of any object 20 or 113 placed on that sheet, so that the packaging is more dependable, particularly when the object to be packaged is ball-shaped or otherwise tends to roll. For this purpose the pressure-sensitive coating can generally be confined to the longitudinally central portion about 25 to about 40 millimeter wide, of the lower packaging sheet.

The foregoing pressure-sensitive coating is also very effective when used with automatic or semi-automatic packaging in which heat sealing is not utilized. Thus by eliminating the heating in the constructions of the drawings, and substituting cohesive-nonadhesive coatings on both packaging sheets, effective packaging is obtained by reason of the cohesion between the coatings on the top and bottom sheets. Cohesive-nonadhesive coatings have a very small amount of tack against other surfaces, and a little top coating of low tack pressure-sensitive adhesive will help hold in place articles that are set on the lower packaging sheet for automatic packaging.

According to a further modification of the present invention, the packaging without heat is conveniently effected with upper and lower packaging sheets only one of which has a low tack pressure-sensitive coating. The application of pressure to the edges of such a package does a good job of sealing the top and bottom packaging sheets to each other, even though the sealed edges can later be pulled apart. In fact the relative simplicity of pulling apart the sheets is a desirable feature of some packaging, as for example when the packages are to be opened and resealed, or opened by invalids or frail individuals or individuals who have partially lost the use of their hands or fingers.

In the foregoing modifications, the low-tack pressure sensitive adhesive is applied as a coating on a surface of plastic foam. However essentially the same sealing and opening features are provided when such adhesive coating is applied to a sheet that has no foam whatever. The absence of foam is however undesirable where very effective cushioning is desired. Only about 1 to 2 millimeter thick foam layers provide sufficient cushioning for many packaging applications, and generally foam layers about 6 millimeters thick are too thick. Closed-cell foams generally provide more protection than corresponding open-celled foams, but otherwise either can be used.

The cushioning of the foregoing backed foam layers is useful for many different purposes some of which are more fully described in the parent cases. A 20 centimeter by 20 centimeter sheet of backed foam coated with light tack pressure-sensitive adhesive can be pressed against an edge of a piece of wooden furniture like a table, and will then adhere sufficiently to protect that edge against damage in handling and shipment. Upon final delivery the protecting sheet is readily pulled off without injuring the edge.

A thin or small object can be protected by wrapping the protective sheet around it with the ends of the sheet projecting, and then pressing those projecting ends together to seal them to each other. Saplings are conveniently protected this way so that they survive shipping bumps and the like. Sandwich type packaging between packaging sheets, is in general easily effected where one sheet has a low-tack pressure-sensitive adhesive coating, and the mating sheet has no coating. The packaged article is not strongly bonded to the adhesive coating and is easily pulled away from it manually, when the package is opened. Such a technique is particularly desirable inasmuch as the uncoated sheet is very inexpensive so that the total packaging expense is relatively low even where the adhesively coated sheet is expensive. This saving follows whether or not the packaging sheets contain a foam layer.

A similar saving can be effected where high-tack pressure-sensitive adhesive is used in place of the low-tack material. Such a packaging combination is particularly useful as a tamper-indicating package, and where the packaged article does not become hopelessly adhered to the sheet carrying the adhesive.

A low-tack or high-tack pressure-sensitive layer can also contain volatile corrosion inhibitor, and can be satisfactorily coated on layers that are treated with anti-stat that is locked in place, as in U.S. Pat. No. 4,623,594. An example of such a combination is a mixture in parts by volume, of 50 parts low ammonia natural latex, 50% solids,
50 parts 50% solids aqueous emulsion of low molecular weight thermoplastic aliphatic hydrocarbon resin such as polypropylene, prepared with anionic emulsifier. (Example—Picconol AA101)
0.75 parts dicyclohexylamine
0.75 parts 2-amino-2-ethyl-1,3-propanediol This mixture is readily applied by roll coating and even in coatings as heavy as 2 grams (dry weight) per square decimeter, is a low-tack coating that provides very good corrosion inhibition.

By substituting a high-tack adhesive such as Hercules' Pentalyn H for the second ingredient, a very effective high-tack coating is obtained, but still better high-tack properties are provided when the first ingredient is also replaced by carboxylated SBR latex such as Polysar 3444 from BASF.

The proportions and identity of the corrosion inhibiting ingredients can also be modified, and the first two ingredients can have their proportions varied from 1:3 to 3:1.

A layer of metallic aluminum, such as an aluminized coating on the foam, can be substituted for the anti-stat or used together with the anti-stat.

For ease of manufacture and use, the foam layer carrying the low-tack pressure-sensitive adhesive can be supported on a paper backing the outer face of which is treated as by siliconizing or by coating with a film of polyethylene that is not corona treated, so as to keep from adhering to the adhesive coating. In such an arrangement a long length of the supported foam laminate can be wound up as a roll, without having the adhesive of one turn adhere to the backing of the next turn. Such a roll can then be very simply unwound for use as needed.

For some purposes it is desirable to have electrically conductive foam layers, as in application Ser. No. 99,727 filed Sept. 22, 1987 (U.S. Pat. No. 4,790,433). such foam is conveniently prepared by depositing electrically conductive particles of carbon or graphite or chromium or the like, in the cells of open-celled foam, using a volatile liquid like water as a carrier in which the conductive particles are suspended. Such deposition is facilitated by first exploding out the internal walls of a suitable foam layer, using an explosive hydrogen-oxygen mixture which is compressed into the foam and then detonated. The conductive foam layer can have its surfaces laminated to carrying films, or coated with anti-stat or cohesive-nonadhesive or pressure-sensitive adhesive, or volatile corrosion inhibitor, or combinations of such coating materials.

Any of the foregoing papers may be reinforced with strands of fiberglass to strengthen them. Reinforcement may also be accomplished by adhering other types of mesh such as polypropylene mesh or polyester scrim to the laminate or between the laminae, or the foam-supporting sheet can be a spun-bonded polyolefin or spun-bonded glass fiber sheet or a sheet woven from oriented flat narrow plastic tapes. Such sheets have tremendous resistance to puncturing and tearing. On the other hand, the foam-supporting sheet can be creped or extensible paper to permit the laminate to better follow contours when applied to concave or convex surfaces.

Where the foam or the supporting sheet carries a cohesive-nonadhesive surface stratum, such a stratum can show a residual level of adhesion enough to cause such stratum to block and greatly resist unwinding of a roll of such coated laminate. This blocking effect is much more pronounced when the cohesive-nonadhesive stratum is applied to a paper face, as compared with a foam face, and also when the surface against which it is wrapped around is a corona-treated or untreated polyethylene, but can be reduced or eliminated by incorporating an inert powder such as clay in the cohesive-nonadhesive layer. Between about 5 and about 15% clay does a very good job without substantially reducing the aggressiveness of the cohesive action.

Anti-static compositions such as potassium formate or those referred to above, as well as the cohesive-nonadhesive compositions also have a significant friction-increasing effect when present by themselves on the surface of a resilient microcellular closed-cell foam.

Other improved packaging sheets of the present invention contain opaquing material.

Backings for the pliable resilient cushiony foam can be of a wear-resistant paper such as 42 pound Kraft liner board or Kraft paper. A very effective laminant for 3/32 inch foam is amorphous polypropylene, or pressure-sensitive adhesives as described in Ser. No. 768,103 filed Aug. 21, 1985 (subsequently abandoned). The foam can be of any resilient cushiony material, as for example, a thermoplastic resin foam made from resins such as polyolefins, particularly polypropylene, polyethylene or polyvinyl chloride, or a polyurethane foam which is not thermoplastic. Foams that are not thermoplastic are preferably open-celled and adhered to their backing by thermoplastic laminants that melt and migrate through the open cells during the heat-sealing action.

Where the articles contacted by the foam are vulnerable to corrosion, the laminate should have its contacting face free of corrosive agents and/or carry volatile corrosion inhibitor. Cohesive-nonadhesive layers as well as pressure-sensitive coatings can be corrosion promotors.

Foam thicknesses greater than about ⅛ inch are relatively expensive, and accordingly not preferred. Thicknesses of 1/16 or even 1/32 inch are effective to provide good cushioning. Backings of 30, 60 or 90 pound Kraft are very effective. Two such Kraft paper or liner board backing plies can be laminated to one layer of foam. Re-enforcing strands of fiberglass or other strong threads can strengthen the backing, whether of one or two plies.

The backing strata can contain or be coated with a polyethylene layer to act as a barrier against liquid water, as described in U.S. Pat. No. 4,263,360.

Some foam-supporting sheets such as spun-bonded polypropylene sheets can be adversely affected by molten adhesives and polyester cements or epoxy cement or the oil-resistant cements of Ser. No. 246,372 (U.S. Pat. No. 4,321,297) can be used for securing the foam to such sheets.

The wrapping sheets of the present invention can be used for any wrapping or interleaving application. The cohesive-nonadhesive layer makes these sheets particularly desirable inasmuch as such sheets are readily secured to each other without the need for supplementary closure materials such as tape, staples or other fasteners, glue, heat sealing or twine. Examples of such use are given in Ser. No. 246,372.

When the foam backing is a thermoplastic film such as polyethylene terephthalate, it is not necessary to use a knife or cutter blade to cut through the laminate, as in the transverse sealings of FIGS. 1 and 2. A heated metal edge or wire is sufficient to melt its way through the foam and backing, so no sharp edges are needed and no edge-sharpening. Such melt-through is further simplified by limiting the melt-through width to about one millimeter or less on each side of the melt-through so very little melting and melting heat is needed. A very good heat sealing of one wrapper sheet to another is obtained with only about ½ to about 1 millimeter of their edges heat sealed together.

Melt-through so narrow also leaves so little heat in the melted-through sheets that cooling and solidification is extremely rapid—generally taking about ½ second or less. It is accordingly desirable to arrange for the heated edge to be withdrawn from the melt zone about ½ second before the heat-sealed sheets are released from the mechanical grip of the cross bars. In addition, no pre-heating of the melt-through site is needed, particularly where the polyethylene terephthalate film is only about one mil, or about 25 microns, thick.

The longitudinal heat sealings of foam strata backed with such a thin thermoplastic film can be correspondingly effected, and do not need the melting shoes 38, 39. The pinch discs or roll pairs used to advance the wrapper sandwich can be arranged so one of each mating pair has its gripping edge circumferentially grooved, with a projecting heated edge extending circumferentially from the mating roll so as to penetrate into the groove as the rolls rotate to advance the wrapper sandwich. Such penetration will effect melt-through as described above, and is best immediately followed by cooling of the melt-through area as by a jet of cold air applied even before the melt-through area emerges from the grip of the pinch rolls. Alternatively, a set of cooling pinch rolls can be arranged immediately downstream of the heat-sealing pinch rolls to engage, squeeze and cool the melt area.

For any of the foregoing heat sealings, the polyethylene terephthalate backing film can be un-metallized or can be metallized on one or both of its faces, even if the metallizing is sufficiently heavy to reduce the transparency of the film by as much as 95% to 100%. Where the metallizing, usually aluminum, is only on one face of the backing film, it can be either on the face laminated to the foam or to the outside face of the film. In the latter location, the metallizing is desirably protected by a top coating of a hard material such as a polyacrylate.

As described above, the laminate of foam to metallized or un-metallized polyethylene terephthalate should have its foam face coated with a protective layer such as a volatile corrosion inhibitor, or antistat, or with cohesive-nonadhesive or combinations of any two or all three of these materials.

Such wrapper laminates containing metallized layers make desirable antistat wrappers, particularly where the wrapper is a folded-over laminate in which the metallized layer below the object wrapped is continuous with the metallized layer above that object.

Obviously, many modifications and variations of the present invention are possible in the light of the above teachings. It is, therefore, to be understood that within the scope of the appended claims the invention may be practiced otherwise than as specifically described.

I claim:

1. In the process of protecting a key surface while work is being done on or near it or where it is used as a temporary walkway, the improvement according to which the surface is covered by a foam laminate having a layer of nonabrasive-faced resilient foam not over about ⅛ inch thick adhered to a supporting wear-resistant layer less than 1/25 inch thick, the face of the foam layer that is not adhered to the supporting layer carrying a stratum of friction-increasing material that reduces the tendency of the laminate to slide along a surface on which that face is placed, and the laminate is placed on the key surface with that face against that surface.

2. The combination of claim 1 in which the key surface protected is an airplane skin.

3. The combination of claim 1 in which the friction-increasing material is a cohesive-nonadhesive layer.

4. The combination of claim 1 in which the friction-increasing material is a low-tack pressure sensitive cement.

5. The combination of claim 1 in which the friction-increasing material is a low-tack pressure-sensitive that does not adhere to the supporting layer adhesive layer.

6. The combination of claim 5 in which the supporting layer is siliconized paper.

* * * * *